Patented Sept. 3, 1935

2,013,362

UNITED STATES PATENT OFFICE 2,013,362

AUTOMATIC DIAPHRAGM

Ödön Riszdorfer, Budapest, Hungary

Application July 18, 1932, Serial No. 623,216
In Hungary July 18, 1931

3 Claims. (Cl. 95—64)

The invention relates to apparatus adapted to vary the area of the light aperture of photographic cameras in which apparatus the screening members by means of which the light aperture is defined are actuated by the current of a photo-cell. Openings are provided in the screening members and the mutual arrangement of the screening members is such that the openings provided overlap each other in part or (in case of full opening) entirely, so as to allow the light sensitive emulsion to become exposed to light entering through the aperture thus formed.

An arrangement embodying my invention is shown, by way of example, on the accompanying drawing, on which:

Fig. 1 is a side view of the apparatus for varying the light aperture, parts of the same being in section;

Fig. 2 is a plan of the said apparatus;

Fig. 3 illustrates an apparatus for varying the area of light apertures of photographic cameras embodying the invention.

In these Figures 11 and 12 are two permanent magnets located one above the other, mutually co-axial coils 13 and 14 being provided to oscillate respectively, between the poles of each of the magnets referred to. The coils are fitted i. e. connected into the circuit of the photo-electric cell in such a manner as to make the deflections to which they will be subject mutually opposite in each case. Screen elements 15 and 16 located in mutually parallel positions on which elements square-shaped openings 19 and 20, respectively, are provided, are fixed on the oscillating coils 13 and 14. These openings are arranged so as to make the amount of their mutual overlap vary in proportion to the deflection the screening elements. When no current flows from the photo-cell, that is to say, when no currents flows through the spools 13 and 14, the two diaphragm elements 15 and 16 are in a position in which each diaphragm element correctly registers or covers the other diaphragm element and the diaphragm openings 19 and 20 register one with the other, and hence, the diaphragm is completely open. The stronger the current passing through the spools 13 and 14, the further the elements 15 and 16 will swing relative to each other in the directions of the arrows, (Fig. 2), and the smaller will become the opening of the diaphragm. When no light hits the cell, the current through the spools 13 and 14 is interrupted and they become deenergized and the shutters regain their normal positions, completely covering each other. The backward movement of the diaphragms into what may be regarded as the zero or initial position may be effected in any appropriate manner, as by employing a spring, exerting force on the spools 13 and 14 to cause a reverse of their movement counter to that into which they are moved when energized.

In the example shown the two screening elements are located between the two halves 17 and 18 of the object lens of the camera. In case square-shaped openings are employed, these openings are preferably arranged so as to make, in the case of both openings, the two corner points 21 and 23 situated opposite to each other, of each opening to be located at the same distance from the axis of oscillation and to form at the same time points of a circular arc passing through the optical axis of the object lens thus causing the two other corner points 22 and 24 to be located along one and the same radius. The reason why this arrangement is particularly favourable is that with this arrangement it will be two corner points which, during the movement of opening will come into mutual contact first, and that the shape subsequently formed during the further course of the movement of opening will be a symmetrical quadrangular shape, the centre of which will be situated in the optical axis of the lens system.

The screens possess parts 28 extending beyond the co-axial shafts 25 which parts are preferably made so as to balance those parts of the screens as have been cut out to form the openings. One of the counterweights is a pointer permitting the magnitude of the light aperture at any time to be read off scale 29. In the case of this arrangement all the resistance which in addition to the magnetic resistances has to be overcome by the current of the photo-cell consists in the pin frictions which in instruments of this kind are of very small magnitude. The openings may also be of other than square shape. Notably, the sides of the openings may also be curved instead of straight-lined, thus enabling the centre of the light aperture to be permanently kept in the optical axis. It is immaterial from the point of view of the invention whether the diaphragm is placed in front of the object lens, behind the object lens or between the individual lenses forming the object lens. Of course, the screening elements may also be more than two in number.

What I claim is:

1. In a photographic camera, the combination of diaphragms, said diaphragms having openings through both of which light is projected when in operation, means for oscillatively mounting the Patented Sept. 3, 1935

2,013,363

UNITED STATES PATENT OFFICE 2,013,363

PHOTOGRAPHIC APPARATUS

Ödön Riszdorfer, Budapest, Hungary

Application September 12, 1932, Serial No. 632,816
In Hungary September 12, 1931

6 Claims. (Cl. 88—23)

I have filed an application for patent upon this apparatus in Hungary on September 12, 1931.

The invention relates to a device for measuring the intensity of illumination, of the type in which a photo-electric cell is employed.

In taking photographs, the quantity of light ensuring correct exposure is in the types of cameras generally used determined by two factors, viz. the magnitude of the diaphragm opening and the shutter speed. These two factors are in mutual dependence, and if, with a given intensity of illumination the value of one of them is assumed, this already determines the most advantageous value of the other factor. The intensity of illumination can be determined with a high degree of accuracy by means of photometers comprising photo-cells. If, after obtaining the figure of the intensity of illumination, one of the two factors referred to, e. g. the magnitude of the diaphragm opening is chosen at a suitable figure, it becomes possible to calculate the other factor, viz. in the case of my example, the corresponding shutter speed. Correct exposure is however, influenced, in addition to shutter speed and magnitude of diaphragm opening, by other factors as well, notably by the sensitivity, usually expressed in Scheiner degrees, of the emulsion employed, the nature of the colour filters employed, and the picture angle of the picture to be taken.

The device for measuring the intensity of illumination according to the invention enables all these factors to be taken into account by allowing these various factors to influence the circuit of the photo-cell in an additive manner. After having selected on the photographic camera the magnitude of the diaphragm opening, the sensitivity of the emulsion, the picture angle of the camera etc. these already determine the most favourable shutter speed also. If therefore the circuit of the photo-cell on the device for measuring the intensity of illumination is permitted to be influenced in proportion to the various factors chosen on the photographic camera, the current intensity of the photo-cell circuit will be proportionate to the best shutter speed. Instead of reading-off current intensities from the measuring instrument indicating the current intensity of the photo-cell, it is possible to immediately read off the corresponding shutter speeds themselves.

In the same way it is possible to determine for the shutter speed chosen beforehand, the corresponding magnitude of the diaphragm opening, or, for instance, to determine, for a given shutter speed and magnitude of diaphragm opening, the corresponding degree of sensitivity of emulsion required etc.

The current of the photo-cell may be controlled by means of resistances inserted into the circuit which resistances are capable of being varied in accordance with the magnitude of the various factors. It is also possible however, to control it by means of variable diaphragms or by means of a combination of diaphragms and resistances; at the same time the exact desired magnitude of the picture angle of the device for measuring the intensity of the illumination can be assured by approaching the photo-cell to the opening for the admission of light of the device for measuring the intensity of illumination, or removing the photo-cell to a greater distance from the said opening.

Embodiments of my invention shown by way of example, are illustrated in detail on the annexed drawing, in which Fig. 1 illustrates the device for measuring the intensity of illumination, in front elevation, and part section, whilst Fig. 2 is a perspective view of a second form of the apparatus with the indicating means arranged in the interior of the casing.

Fig. 3 is a perspective view of the device shown in Fig. 2 with portions in section.

Casing 1 contains the movable inner casing 2, at the end of which the photo-electric cell 3 is arranged. Light enters through the opening 4 and falls on the photo-electric cell 3, which in my example is a photo-voltaic cuprous oxide cell, and induces a current in the circuit 5 of the cell. The current flows in the current indicating instrument 6 through the coil 8 situated between the magnet-poles of the horse-shoe-shaped permanent magnet 7 and deflects the latter together with the needle 9 in front of the scale 10 the divisions of which represent shutter speeds. The quantity of light falling on the cell is influenced by means of the diaphragm 11 which latter is adjusted by means of the diaphragm setting 12. The needle 13 fixed on the diaphragm setting moves in front of the diaphragm scale 14. The contact lever of the resistance 16, which controls the variable resistance 17 connected into the circuit of the cell moves in front of the scale part 15, the divisions of which represent the degrees of sensitivity of the emulsion. The picture angle can be varied by fixing the inner casing 2, by means of screw 19, in various positions in front of the scale part 18 which latter registers the picture angle. The magnet can also be arranged around the casing 1. In this case, the instrument for measuring current intensity called in what follows, in short, the ammeter, is also placed inside the casing. The needle 21 of the ammeter moves in front of the scale 22. The scale is engraved on the glass plate 23. In order to enable the scale to be observed, a circular opening 24 is provided on the photo-cell, the cone for the protection of the operator's eye being placed in front of this opening.

When making use of the device for the measurement of the intensity of illumination the picture angle of the cell is adjusted on scale 18 so as to correspond to the picture angle of the photographic camera. Diaphragm 11 is adjusted so as to correspond to the diaphragm opening of the camera, whilst the degree of sensitivity of the emulsion is taken into account by adjusting on scale 15,—the divisions of which represent degrees of sensitivity of emulsion, the contact lever 16 moving over the variable resistance 17. Following this the device for measuring the intensity of illumination is aimed at the object to be photographed. A current the intensity of which corresponds to the intensity of illumination of this object, but is also influenced by diaphragm 11 and by resistance 17, will flow in the circuit of the photo-cell. The cell current influenced in accordance with the various factors will deflect the needle 9, which latter will indicate on scale 10 the most favourable shutter speed corresponding to the intensity of illumination of the object, to the chosen diaphragm opening of the camera and to the degree of sensitivity of the emulsion employed. In the case of the arrangement shown in dotted lines the method of operation is the same.

The substance of the invention consists in influencing the circuit of the cell in accordance with various factors determining correct exposure, as shutter speed, magnitude of diaphragm opening, degree of sensitivity of emulsion etc. Accordingly it is possible to employ, instead of the diaphragm 11 shown in the example described, a second resistance connected into the circuit of the cell, such resistance being varied in proportion to the magnitude of the diaphragm opening of the camera. Similarly the chosen shutter speed can be adjusted by means of a resistance and in this case the needle of the ammeter will instead of indicating shutter speed as in the example described, indicate the corresponding magnitude of diaphragm opening. In case it is desired to take into account, in addition to the above, other factors determining correct exposure as well, all that has to be done is to insert further resistances, capable of being suitably varied, into the circuit of the photo-cell.

What I claim is:

1. In an exposure meter for photographic purposes, a tubular casing having an opening at one end for the admission of light and a sight hole at its other end, a diaphragm controlling the first opening, a transparent scale-bearing member in the casing visible through said sight opening, a pointer pivoted in the casing to traverse said scale, an electro-magnetic device in the casing carrying said pointer to move the pointer over the scale, a photo-electric cell in the path of the light from the diaphragm opening to the sight opening apertured to allow light to pass therethrough to the sight opening, and series connections between said cell and electro-magnetic means.

2. In an exposure meter for photographic purposes, a tubular casing having an opening at one end for the admission of light and a sight hole at its other end, a diaphragm controlling the first opening, a transparent scale-bearing member in the casing visible through said sight opening, a pointer pivoted in the casing to traverse said scale, an electro-magnetic device in the casing carrying said pointer to move the pointer over the scale, a photo-electric cell in the path of the light from the diaphragm opening to the sight opening apertured to allow light to pass therethrough to the sight opening, and series connections between said cell and electro-magnetic means, said scale being graduated to indicate one of the camera functions including the two functions of shutter speed and camera diaphragm opening and the cell having its light sensitive elements wholly within the casing.

3. In an exposure meter for photographic purposes, a tubular casing having an opening at one end for the admission of light and a sight hole at its other end, a diaphragm controlling the first opening, a transparent scale-bearing member in the casing visible through said sight opening, a pointer pivoted in the casing to traverse said scale, an electro-magnetic device in the casing carrying said pointer to move the pointer over the scale, a photo-electric cell in the path of the light from the diaphragm opening to the sight opening apertured to allow light to pass therethrough to the sight opening, and series connections between said cell and electro-magnetic means, said casing including a pair of telescopic tubes and means to adjust the telescopic relation of said tubes, the diaphragm being at the outer end of one tube and the sight opening at the outer end of the other tube.

4. In an exposure meter for photographic purposes, a tubular casing having an opening at one end for the admission of light and a sight hole at its other end, a diaphragm controlling the first opening, a transparent scale-bearing member in the casing visible through said sight opening, a pointer pivoted in the casing to traverse said scale, an electro-magnetic device in the casing carrying said pointer to move the pointer over the scale, a photo-electric cell in the path of the light from the diaphragm opening to the sight opening apertured to allow light to pass therethrough to the sight opening, and series connections between said cell and electro-magnetic means, said electro-magnetic means including an arcuate permanent magnet concentric with the optical axis of the casing to present free passage of light from the diaphragm to the sight opening.

5. In an exposure meter for photographic purposes, a tubular casing having an opening at one end for the admission of light and a sight hole at its other end, a diaphragm controlling the first opening, a transparent scale-bearing member in the casing visible through said sight opening, a pointer pivoted in the casing to traverse said scale, an electro-magnetic device in the casing carrying said pointer to move the pointer over the scale, a photo-electric cell in the path of the light from the diaphragm opening to the sight opening apertured to allow light to pass therethrough to the sight opening, series connections between said cell and electro-magnetic means, and a regulatable resistance in said series connections.

6. In an exposure meter for photographic purposes, a tubular casing having an opening at one end for the admission of light and a sight hole at its other end, a diaphragm controlling the first opening, a transparent scale-bearing member in the casing visible through said sight opening, a pointer pivoted in the casing to traverse said scale, an electro-magnetic device in the casing carrying said pointer to move the pointer over the scale, a photo-electric cell in the path of the light from the diaphragm opening to the sight opening apertured to allow light to pass therethrough to the sight opening, series connections between said cell and electro-magnetic means, and a regulatable resistance in said series connections and provided with means exterior of the casing for regulating the resistance whereby the resistance may be regulated to suit plate sensitiveness, the light filter used and the like.

ÖDÖN RISZDORFER.